Feb. 24, 1970    R. MIMEUR    3,497,155
FISHING REEL
Filed May 12, 1966
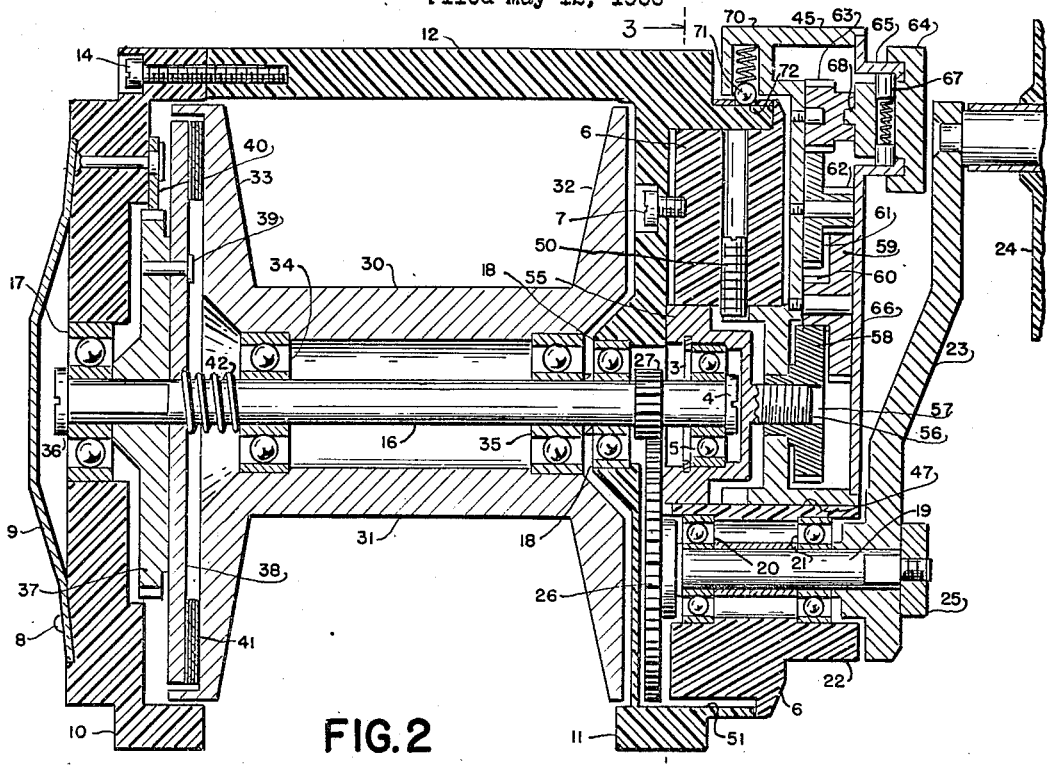
FIG. 2
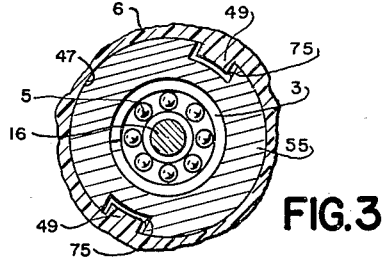
FIG. 3
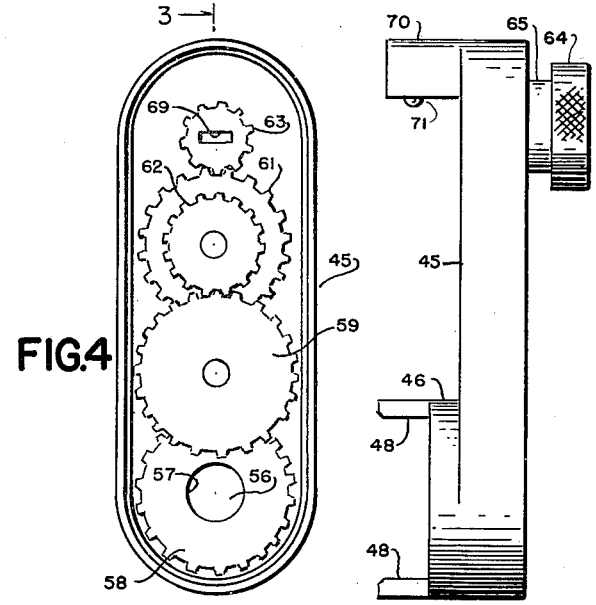
FIG. 4
FIG. 5
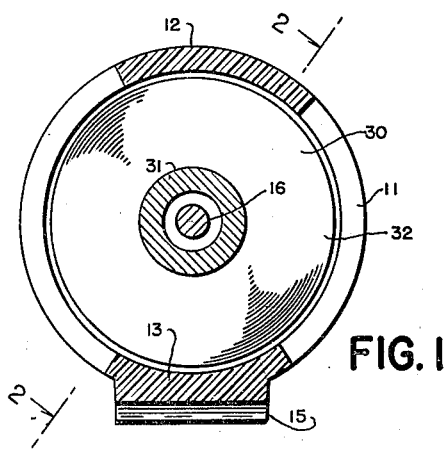
FIG. 1
BY *Bradley Cohn*
ATTORNEY

United States Patent Office 3,497,155
Patented Feb. 24, 1970

3,497,155
FISHING REEL
Robert Mimeur, Sallanches, France, assignor to Carpano & Pons S.A., a corporation of France
Filed May 12, 1966, Ser. No. 549,665
Int. Cl. A01k *89/02;* F16d *13/76*
U.S. Cl. 242—84.54                                    12 Claims

ABSTRACT OF THE DISCLOSURE

A fishing reel frame has two, spaced apart housings supporting opposite ends of a shaft on which the spool rotates. Crank-operated gear means in the first housing is connected to the shaft at its first end while an axially applied, friction clutch-brake connects the opposite end of the shaft to the spool. A tension element on the first end of said shaft permits rotation of the shaft while connecting it and its clutch-brake to adjustment means for axial shifting to regulate the force exerted thereby. Clutch-brake adjustment means includes a lever connected to the tension element so that pivoting of the lever shifts the tension element in an associated threadedly connected adjustment gear. The adjustment gear can itself be shifted relative to the lever by meshed gearing carried in the lever and terminating in an operating knob. Suitable pawl and ratchet means prevent reverse rotation of the clutch-brake.

---

This invention relates in general to fishing reels and more particularly, to fishing reels having adjustable brake mechanisms.

A main object of this invention is to provide a fishing reel and brake mechanism which is more easily used giving greater and more rapid control of the brake action.

Another object of this invention is to provide a fishing reel having a brake mechanism which is set to a desired degree by throwing a single lever to one of several positions.

A further object of this invention is to provide a fishing reel having a brake mechanism which is set to a desired degree by throwing a single lever to one of several positions, adjustment of the braking force at the positions of the lever being set by turning a knob located for easier access at the free end of the lever.

Still another object of this invention is to provide a fishing reel and brake mechanism which may be more simple in construction and which may be more rugged and dependable in service.

Many other objects, advantages, and features of invention reside in the particular construction, combination and arrangement of parts involved in the embodiment of the invention and its practice otherwise as will be understood from the following description and accompanying drawings wherein:

FIG. 1 is a vertical transverse section through the center of a fishing reel according to this invention;

FIG. 2 is a section taken on line 2—2 of FIG. 1;

FIG. 3 is a vertical section taken on line 3—3 of FIG. 2 showing a fragment of a reel housing end plate within which is disposed a brake setting tension element;

FIG. 4 is an end view of the brake lever of this invention with its cover plate and adjustment knob removed; and FIG. 5 is a rear view of the brake lever removed from the reel.

Referring to the drawing in detail, the reel of this invention has a first circular end housing 10. A second circular end housing 11 has upper and lower lateral projections 12 and 13 molded integrally with it to extend to housing 10. Screws 14 extend through housing 10 into projections 12 and 13 to secure the end housings 10 and 11 in a parallel spaced apart relationship. The lower central portion of projection 13 may have a rod attachment portion 15 formed on it as shown in FIG. 1.

A cover 9 may be fixed over end housing 10 by screws 8. Screws 7 hold end plate 6 partially within a circular opening 51 of housing 11.

Shaft 16 is rotatably secured in housing 10 by bearing 17 and in housing 11 by bearing 18. Drive shaft 19 is rotatably secured by bearings 20 and 21 in boss 22 of end plate 6. A crank arm 23 and attached handle 24 are fixed to drive shaft 19 by means of a nut 25. A large drive gear 26 is fixed to the inner end of shaft 19 to engage a pinion 27 formed on shaft 16.

Line reel 30, having a central hollow core 31 and the side flanges 32 and 33, is rotatably mounted on shaft 16 by the bearings 34 and 35. End screw 36 fixes bearing 17 and ratchet wheel 37 on shaft 16. Brake disk 38 is fixed to the inside side of rachet wheel 37 by means of rivets 39 to rotate with it. A conventional fishing reel ratchet dog 40 engages ratchet wheel 37. Friction disks 41 on brake disk 38 may engage the side flange 33 of line reel 30. Compression spring 42 urges brake disk 38, ratchet wheel 37 and shaft 16 to the left as shown in FIG. 2 so that the friction disks 41 on brake disk 38 do not engage side flange 33 of line reel 30. Thus it may be seen that handle 24 and crank 23 may freely rotate shaft 16 within reel 30 and reel 30 may freely rotate about shaft 16.

The brake lever 45 has a lower end terminating in an inwardly projecting boss 46 as shown in FIG. 5. Boss 46 may rotate within a circular aperture 47 in the center of end plate 6. Two projections 48 extend within aperture 47. A stop 50 is turned to extend into aperture 47 to engage the projections 48 and limit rotation of brake lever 45 to about 120 degrees.

A tension element 55 is disposed in aperture 47 about the end of shaft 16 inside the boss 46 of brake lever 45. Bearing 5 is held on shaft 16 by the cap screw 4. Bearing 5 is held within tension element 55 by a retaining ring 3. The tension element 55 terminates in a threaded stud 56 which engages and is turned into the threaded aperture 57 of gear 58. Gear 58 is rotatably mounted within the lower end of brake lever 45.

As shown in FIGS. 2 and 4, the brake lever 45 contains the rotatably mounted gear and pinion 59 and 60, the rotatably mounted gear and pinion 61 and 62, and the rotatably mounted pinion 63.

A brake adjustment knob 64 is rotatably mounted on the boss 65 of the cover 66 of brake lever 45. Spring urged retaining pins 67 keep knob 64 in place on boss 65 and prevent it from freely turning by maintainig a light frictional drag. An inward projection 68 of knob 64 enters a slot 69 of pinion 63. Thus it may be seen that extensive rotation of knob 64 through the gear train of pinion 63 driving gear 61, pinion 62 driving gear 59, and pinion 60 driving gear 58, will rotate gear 58. Thus rotation of knob 64 will, with brake lever 45 remaining in one position, rotate gear 58 to draw tension element 55 to the right as shown in FIG. 2. This will draw shaft 16 to the right against the compression of spring 42 so the friction disks 41 on brake disk 38 will engage the flange 33 of line reel 30. Thus when ratchet wheel 37 is held by dog 40, the turning of knob 64 adjusts the brake to a desired tension for a given position of brake lever 45. Since crank 23 drives line reel 30 through brake disk 38, line tension when reeling is set simultaneously with the brake.

As shown in FIG. 3, lugs 49 are formed at the inner portion of aperture 47 to engage slots 75 formed in the periphery of tension element 55. The slots 75 and the lugs 49 allow the tension element to slide inward and outward without rotating.

Brake lever 45 has a lateral extension 70 formed on its outer end from which a ball detent 71 is spring-urged inwardly. An outward facing shoulder of housing 11 contains a number of apertures 72 to be engaged by the ball detent 71 so that brake lever 45 may be set rapidly in a number of positions. Thus the brake and reeling tension may be very quickly set by swinging brake lever 45 from one position to another as the rotation of brake lever 45 turns gear 58 with it. As has been described, the rotation of gear 58 in one direction draws tension element 55 and shaft 16 to the right as shown in FIG. 1 to increase the brake tension. Throwing the brake lever 45 in the other direction will rapidly release the brake. Since the retaining pins 67 prevent the rotation of knob 64, a given brake tension setting for a given position of brake lever 45 will be maintained even after the lever 45 has been moved.

Thus the reel of this invention provides a rapid brake adjustment by moving brake lever 45 from one position to another as a fish is being fought and it provides a very fine brake adjustment for any position of lever 45 by turning knob 64. Since brake adjustment knob 64 is located at the end of lever 45, it is more readily accessible as it is disposed as far as possible from shaft 19 which carries crank 23.

While this invention has been disclosed in the best form known, it will nevertheless be understood that this is purely exemplary and that modifications in the construction, arrangement and combination of parts and the substitution of equivalents mechanically and otherwise, may be made without departing from the spirit and scope of the invention except as it may be more limited in the appended claims wherein:

I claim:
1. A fishing reel comprising, in combination, first and second housing spaced apart from each other, a shaft extending laterally between said housings, said shaft having a first end rotatably mounted in said first housing and a second end rotatably mounted in said second housing. a shaft gear on said second end of said shaft, a ratchet wheel fixed on said first end of said shaft, a line reel having two side flanges rotatably mounted on said shaft between said shaft gear and said ratchet wheel, brake means on said ratchet wheel adjacent to a side flange of said line reel, a crank driven gear engaging said shaft gear driving said shaft and thereby said ratchet wheel, a tension element disposed at the second end of said shaft, said tension element having a threaded portion, means rotatably gripping said second end of said shaft to said tension element, a lever having a threaded aperture turned about the threaded portion of said tension element, and means holding said lever a given distance from said second housing, rotation of said lever screwing said threaded portion of said tension element into said lever pulling said tension element and said shaft in the direction of said second housing forcing said brake means on said ratchet wheel against said line reel setting a brake tension on said line reel.

2. The combination according to claim 1 wherein said lever has a first rotatably mounted element at one end of said lever, said first rotatably mounted element containing the threaded aperture turned about the threaded portion of said tension element, a second rotatably mounted element at the other end of said lever, means connecting said second rotatably mounted element to said first rotatably mounted element so that rotation of said second rotatably mounted element rotates said first rotatably mounted element, and an adjustment knob on said lever turning said second rotatably mounted element, rotation of said adjustment knob setting brake tension on said line reel when said lever is in a given position.

3. The combination according to claim 2 wherein said first and second rotatably mounted elements are gears and wherein said means connecting said first and second rotatably mounted gears is a gear train.

4. The combination according to claim 3 wherein said gear train connecting said first and second rotatably mounted gears reduces turns of said first rotatably mounted gear.

5. The combination according to claim 4 with the addition of frictional drag means resisting the rotation of said adjustment knob and said second rotatably mounted gear.

6. The combination according to claim 1 with the addition of spring means urging said shaft away from said second housing.

7. The combination according to claim 1 wherein said means holding said lever a given distance from said second housing comprises a boss on said lever formed coaxially with said first rotatably mounted gear, and an end plate containing an aperture within which said boss rotates, said end plate being fixed adjacent to said second housing.

8. The combination according to claim 7 wherein said tension element is disposed within the aperture in said end plate adjacent to the boss of said lever, said tension element having a hollow portion disposed about the second end of said shaft.

9. The combination according to claim 8 wherein said means rotatably connecting said second end of said shaft to said tension element consists of a bearing mounted on said second end of said shaft, and means retaining said bearing within the hollow portion of said tension element.

10. The combination according to claim 9 wherein said tension element contains at least one longitudinal slot and with the addition of at least one lug formed to project within the aperture in said end plate to enter said at least one slot preventing rotation of said tension element within said end plate.

11. The combination according to claim 10 with the addition of at least one inward projection from the boss of said lever within the aperture in said end plate, and stop means projecting within the aperture in said end plate, said stop means and said at least one projection limiting the rotation of said lever.

12. The combination according to claim 11 with the addition of detent means on said lever remote from said boss of said lever, and wherein said second housing contains spaced apart apertures engaged by said detent means to position said lever.

References Cited

UNITED STATES PATENTS

| | | | |
|---|---|---|---|
| 2,182,423 | 12/1939 | Cabassa. | |
| 2,531,610 | 11/1950 | Butzman | 242—84.46 XR |
| 2,569,006 | 9/1951 | King. | |
| 3,000,477 | 9/1961 | Dunn | 242—84.44 XR |
| 3,017,135 | 1/1962 | Wood | 242—84.54 |
| 3,104,075 | 9/1963 | Wood | 242—84.54 |
| 3,146,966 | 9/1964 | Dunn | 242—84.45 |

BILLY S. TAYLOR, Primary Examiner

U.S. Cl. X.R.

192—14, 83, 96